United States Patent [19]

Paolucci et al.

[11] Patent Number: 5,707,017
[45] Date of Patent: Jan. 13, 1998

[54] COMBINATION LEAF AND LAWN DEBRIS BLOWER, COMMINUTING VACUUM, AND WOOD CHIPPER

[75] Inventors: James Paolucci, Pottstown, Pa.; Jeffrey M. Arendt, Racine, Wis.

[73] Assignee: MacKissic Inc., Parker Ford, Pa.

[21] Appl. No.: 679,409

[22] Filed: Jul. 9, 1996

[51] Int. Cl.$^6$ ..................................................... B02C 18/06
[52] U.S. Cl. .................. 241/55; 241/92; 241/101.78; 241/300.1
[58] Field of Search ........................ 241/55, 92, 101.78, 241/300.1, 56

[56] References Cited

U.S. PATENT DOCUMENTS

| | | | |
|---|---|---|---|
| Re. 23,650 | 5/1953 | Flateboe | 241/92 |
| 1,247,460 | 11/1917 | Sinclair . | |
| 1,808,509 | 6/1931 | Prouty et al. . | |
| 1,907,791 | 5/1933 | Gredell . | |
| 2,145,728 | 1/1939 | Mankoff | 83/11 |
| 2,181,397 | 11/1939 | Everett | 146/79 |
| 2,294,921 | 9/1942 | Lykken | 83/11 |
| 2,298,712 | 10/1942 | Mankoff | 83/11 |
| 2,477,627 | 8/1949 | Lanter | 241/55 X |
| 2,678,169 | 5/1954 | Tullis | 241/186 |
| 2,756,788 | 7/1956 | Fish et al. | 144/242 |
| 2,838,248 | 6/1958 | Ringman | 241/92 |
| 3,384,311 | 5/1968 | Eklund et al. | 241/56 |
| 3,392,763 | 7/1968 | Ledergerber | 144/176 |
| 3,410,495 | 11/1968 | Eklund | 251/278 |
| 3,549,093 | 12/1970 | Pallmann | 241/49 |
| 3,635,410 | 1/1972 | Smith | 241/56 |
| 3,844,489 | 10/1974 | Strong | 241/55 |
| 3,946,952 | 3/1976 | Martin | 241/56 |
| 4,117,983 | 10/1978 | Browning | 241/55 |
| 4,159,083 | 6/1979 | Lapointe | 241/68 |
| 4,390,132 | 6/1983 | Hutson et al. | 241/55 |
| 4,834,302 | 5/1989 | Baker | 241/92 |
| 4,951,882 | 8/1990 | Ober | 241/55 |
| 5,018,672 | 5/1991 | Peck et al. | 241/37.5 |
| 5,205,496 | 4/1993 | O'Donnell et al. | 241/34 |
| 5,240,189 | 8/1993 | Majkrzak et al. | 241/55 |
| 5,323,975 | 6/1994 | Fulghum, Jr. | 241/92 |
| 5,340,035 | 8/1994 | Ford | 241/55 |
| 5,381,970 | 1/1995 | Bold et al. | 241/55 |
| 5,385,308 | 1/1995 | Gearing et al. | 241/101.7 |
| 5,419,499 | 5/1995 | Bourne | 241/18 |
| 5,503,340 | 4/1996 | Doppstadt | 241/189.1 |

*Primary Examiner*—John M. Husar
*Attorney, Agent, or Firm*—Seidel Gonda Lavorgna & Monaco, PC

[57] ABSTRACT

An apparatus for comminuting lawn debris comprises an impeller housing defined by a pair of opposed axial end walls and a substantially voluted peripheral wall therebetween and includes inlet openings located on opposite end walls for introducing material into the housing and a discharge opening located on the peripheral wall for discharging material from the housing. The impeller is rotatably mounted on a drive shaft within the housing. The impeller includes a backing plate and a plurality of radially extending blades fixed to one face of the backing plate. The impeller blades cause air to be drawn in from an inlet opening and to be propelled axially into the housing and through the discharge opening. The comminuting blades shred material within the housing thereby reducing the size of the material. A chipper knife is attached to the face of the impeller opposite the blades for chipping material passing into the housing through one of the inlet openings. An aperture permits material chipped with the knife to pass to the opposite side of the impeller. A stator is attached to the inner face of the annular wall and includes serrated teeth. The impeller causes material to be propelled from the chipper knife and comminuting blades and strike the serrated teeth of the stator and be propelled toward the discharge opening.

23 Claims, 3 Drawing Sheets

COMBINATION LEAF AND LAWN DEBRIS BLOWER, COMMINUTING VACUUM, AND WOOD CHIPPER

FIELD OF THE INVENTION

The invention relates to a leaf, lawn, garden debris, brush, and limb disposal apparatus. More particularly, it relates to a multipurpose apparatus that fulfills the requirements of four separate machines, a debris comminutor or mulcher, a debris vacuum and bagger, a wood chipper, and a leaf and lawn debris blower.

BACKGROUND OF THE INVENTION

The problem of leaf and lawn debris disposal has changed over the past several decades. In the past, leaves and other organic lawn and garden debris, such as tree limbs and branches were raked by hand, collected, and burned in an open pile. As concerns over clean air increased, open burning became an unacceptable means of disposing of lawn and garden debris.

More recently, leaf, garden, and lawn debris was collected in piles and allowed to decompose or was hauled or taken to landfills for burying. The decomposition of intact leaves, however, is slow and could take several years before the material completely decays. Although landfills have proven to be an effective disposal method, in recent times the environmental concerns associated with landfills have increased and the cost of burying refuse has escalated dramatically. In addition, the availability of landfills has become limited.

Over the years, many comminuting devices, such as chippers, shredders, and vacuums, have been created to deal with such debris problems. None of these prior art devices, however, is capable of comminuting and mulching lawn debris, vacuuming and bagging lawn debris, chipping wood debris, and serving as a mobile debris blower.

SUMMARY OF THE INVENTION

The invention relates to an apparatus for comminuting lawn debris. The apparatus comprises a housing having a first inlet opening for introducing material into the housing and a discharge opening for discharging material from the housing. An impeller is rotatably mounted on a drive shaft within the housing. A shredder is located between one side of the impeller and the first inlet opening for shredding material passing into the housing through the first inlet opening. A stator disposed radially outwardly from the impeller includes serrated teeth so that material passing radially outwardly from the impeller strikes the serrated teeth, further reducing the material. The stator is attached to the inner face of a peripheral wall of the housing.

The serrated teeth may comprise a plurality of rows of aligned substantially triangular teeth each having a serrated edge.

The impeller may include a backing plate and a plurality of radially extending blades on one face of the backing plate. The backing plate forms a containment surface for limiting the movement of material in one direction along the drive shaft. The shredder comprises an angled serrated edge of each blade. The peripheral wall of the housing has a substantially voluted shape which cooperates with the impeller blades causing air drawn in from the first inlet opening to be propelled by the impeller blades axially into the housing and through the discharge opening. The discharge opening is located on the peripheral wall.

The housing may include a second inlet opening for introducing material into the housing. The first and second inlet openings introduce material into the housing from opposite axial end walls of the housing. A chipper disposed between the second inlet opening and an opposite face of the impeller backing plate may also be provided for chipping material passing into the housing through the second inlet opening. The impeller causes material from the shredder and the chipper to strike the serrated teeth of the stator and be conveyed toward the discharge opening.

The chipper may comprise a knife attached to the opposite face of the impeller backing plate. The backing plate may include an aperture adjacent the knife which permits material chipped by the knife to pass to the opposite side of the impeller.

A vacuum hose may be provided the first inlet opening for facilitating the introduction of material into the housing.

Additional features and advantages of the invention will become apparent to those skilled in the art upon consideration of the following detailed description of the preferred embodiment exemplifying the best mode of carrying out the invention as presently perceived. The detailed description particularly refers to the accompanying drawings.

DETAILED DESCRIPTION OF THE PREFERRED EMBODIMENT

Figure 1:
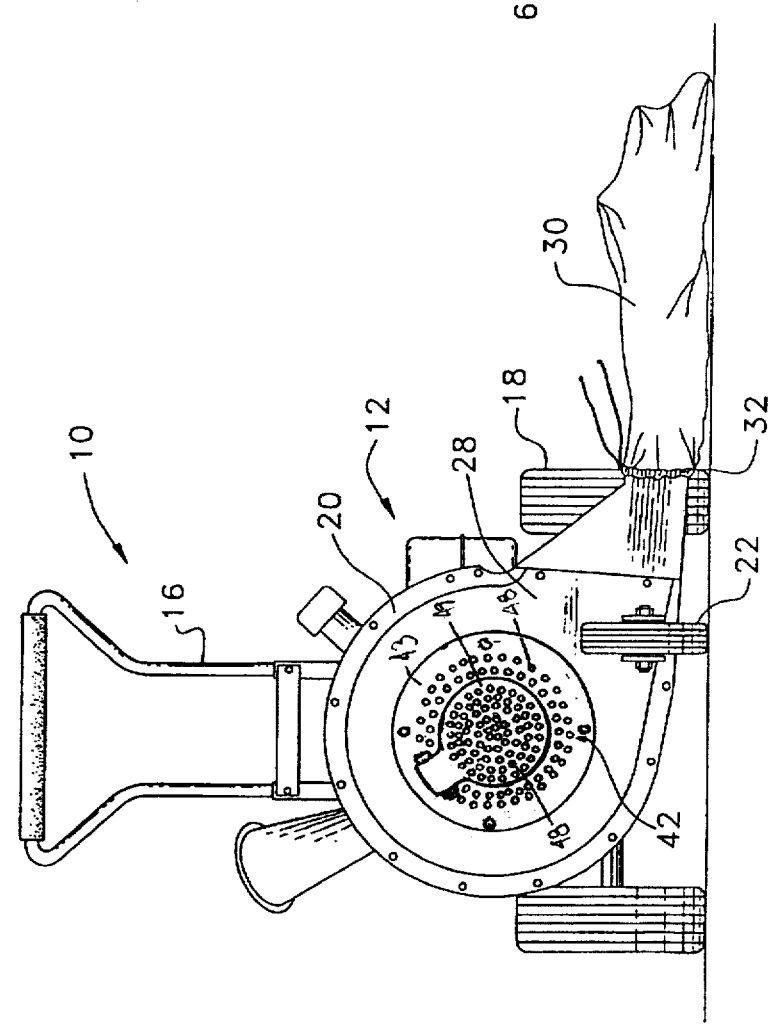
FIG. 1 is a front elevational view of the apparatus for comminuting lawn debris of the present invention.
Figure 2:
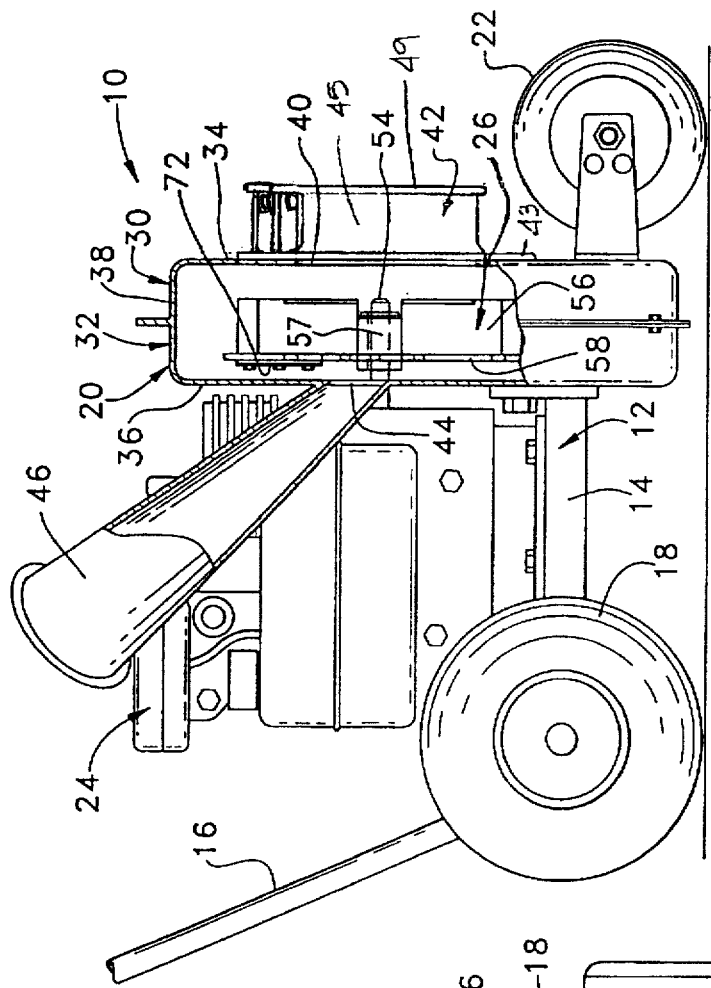
FIG. 2 is a partial cut away side elevational view of the apparatus of FIG. 1.

Referring now to the drawings, FIGS. 1 and 2 illustrate an embodiment of the invention in the form of a portable apparatus 10 for comminuting lawn debris 10 carried by a transport cart 12. The transport cart 12 comprises a chassis body 14 having a tubular handle 16 attached to the chassis body 14. Mounted on the rear of the chassis body 14 are cooperating wheel and axle means 18. An impeller housing 20 is attached to the front of the chassis body 14. Mounted on the front of the impeller housing is a cooperating wheel and axle means 22 which, along with the wheel and axle means 18, permit the apparatus to be transported.

The apparatus 10 may be powered by a conventional internal combustion gasoline engine 24. However, the apparatus 10 may be electrically powered or use any mode of mechanical energy suitable to rotate the impeller 26 which is positioned within the impeller housing 20. Conventional gearing and mechanical energy transfer means (not shown) may be used to provide power transfer from the power source to the operative elements of the shredder.

Figure 3:
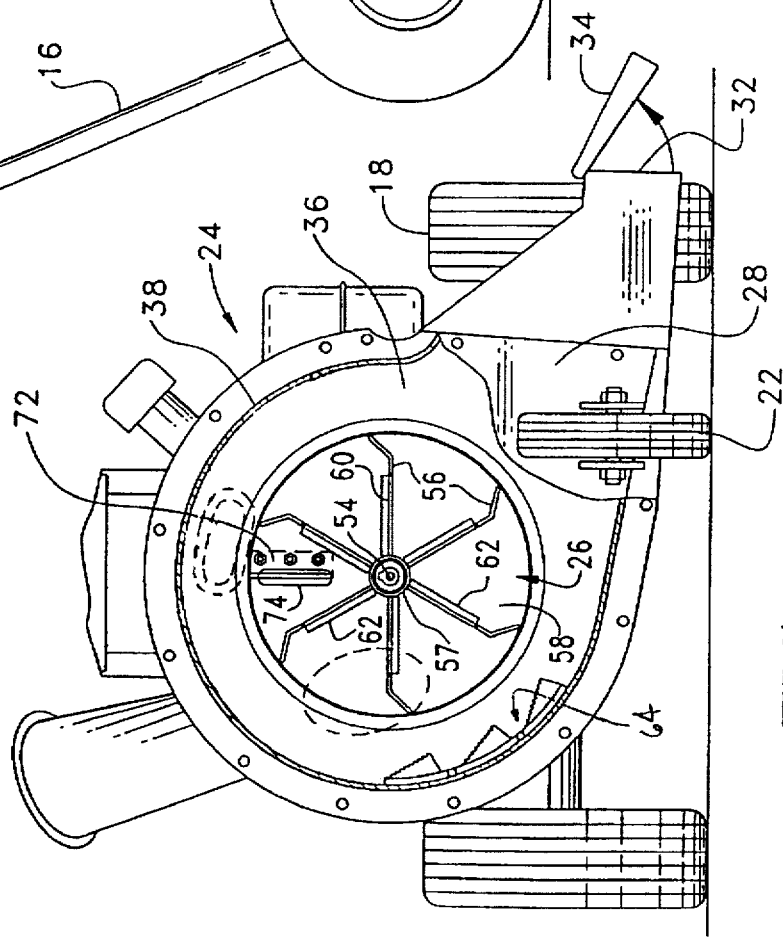
FIG. 3 is a partial cut away front elevational view of the apparatus of FIG. 1.

As may be seen in FIG. 3, the impeller housing 20 is substantially annular in the upper area of the impeller 26 and widens to form a delivery chute 28 in the lower area thereof. The housing 20, thus, has a generally voluted shape. The delivery chute 28 narrows to promote delivery of shredded material to an optional collection bag 30 (FIG. 1) through a discharge opening 32. A pivoting door or flap 34 (FIG. 3) can also be provided at the discharge opening 32 for controlling the direction of flow and limiting the velocity of shredded material exiting the delivery chute 28 when the collection bag 30 is not used.

As shown in FIG. 3, the impeller housing 20 is formed from a pair of joined housing halves 30 and 32 having smooth, curved interior walls. The housing halves 30 and 32 define a first axial end wall 34 and a second axial end wall 36 joined together by a generally peripheral wall 38 forming the impeller housing 20. A first inlet opening 40 is formed in the first axial end wall 34 for feeding material into the impeller housing 20.

A housing cover 42 is fastened to the outer face of the first axial end wall 34 for covering the first inlet opening 40, while permitting the influx of air under the influence of the impeller 26. The housing cover 42 includes an annular flange 43 for attachment to the first axial end wall 34 and an extending annular neck 45 (FIG. 3) which is aligned with the first inlet opening 44. A pivotable cap 49 covers the opening in the neck 45. A plurality of vent holes 48 are formed in the flange 43 and the cap 49 for allowing air to enter the impeller housing 20. Generally, the flange 43 of the housing cover 42 is fixedly attached by conventional means, e.g., lug nuts and cooperating bolts or like fasteners, at the first inlet opening 40.

A second inlet opening 44 is formed in the second axial end wall 36 for feeding material into the impeller housing 20. A frustoconical feed hopper 46 is attached to the second axial end wall 36, in communication with the second inlet opening 44, for feeding larger branches and the like into the impeller housing 20.

Figure 4:
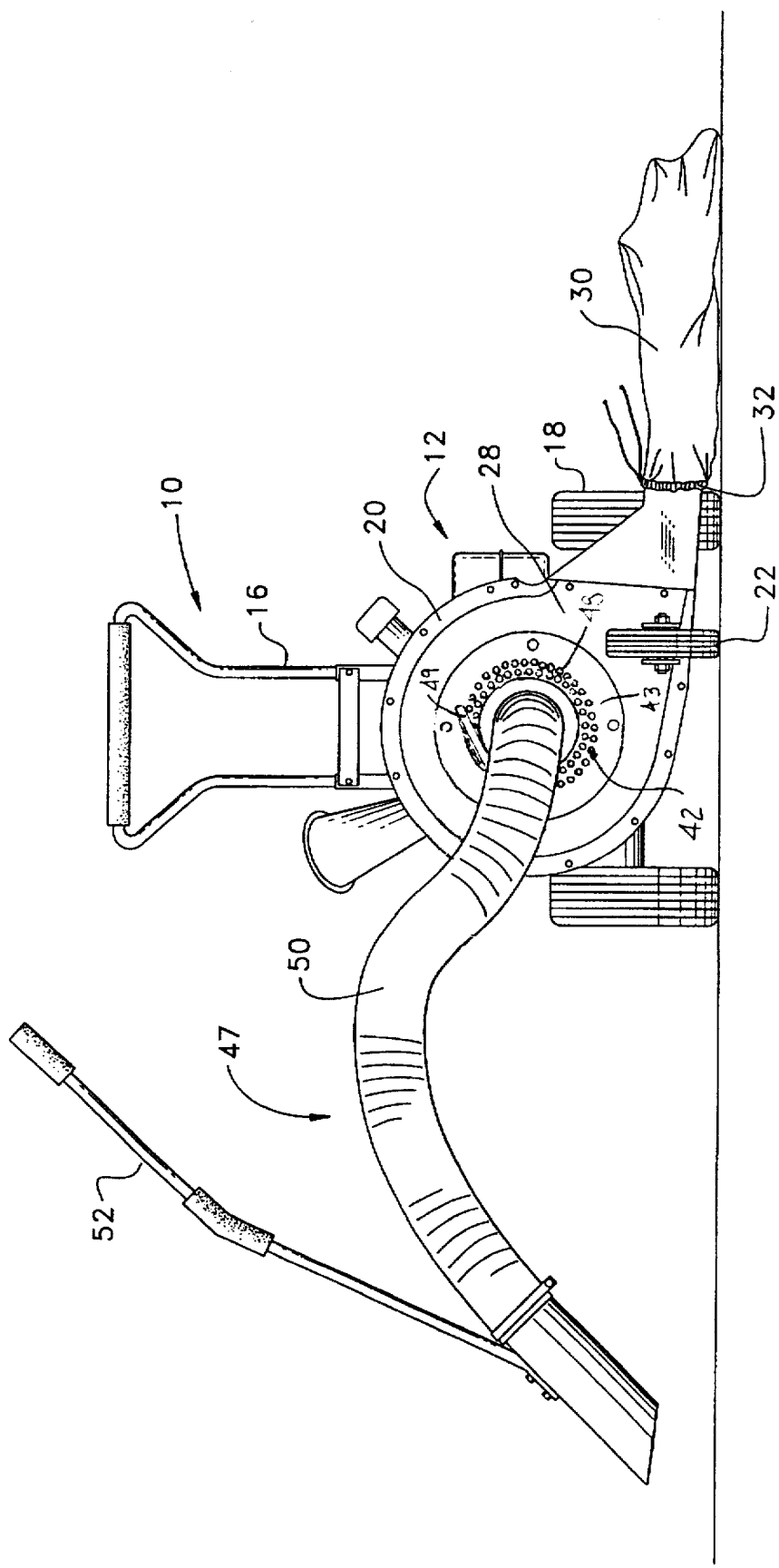
FIG. 4 is a front elevational view of the apparatus of FIG. 1 with a vacuum hose attachment.

In FIG. 4 the cap 49 is shown pivoted into an open position and a vacuum hose attachment 47 is removably attached to the neck 45. The vacuum hose attachment 47 serves to deliver material to be shredded to the impeller 26. A handle 52 can also be provided to allow convenient movement of the end of the vacuum hose 50 during use.

As seen in FIGS. 2 and 3, the impeller 26 is mounted on axial drive shaft 54 for counter-clockwise rotation. The impeller 26 comprises a plurality of impeller blades 56 which extend radially from a central hub 57. The impeller blades 56 are fixedly attached to an impeller backing plate 58. The impeller 26 is designed to discharge 1650 CFM of air at 150 MPH.

The backing plate 58 provides a containment surface for the material which has passed to a position within the impeller structure between the impeller blades 56. Each impeller blade 56 has an angled distal end for directing the flow of air. The edge 60 of each cutting blade 56 remote from the backing plate 58 is bent perpendicular to the leading face of the impeller blade 56 near the center of the impeller. This bent edge 60 includes a plurality of serrated teeth 62, or an otherwise sharpened edge, for comminuting or shredding material which comes into contact with the impeller 26. Once the material is shredded by the impeller 26, it is then directed by the air flow generated by the impeller and by centrifugal force radially outward from the impeller 26.

Figure 5:
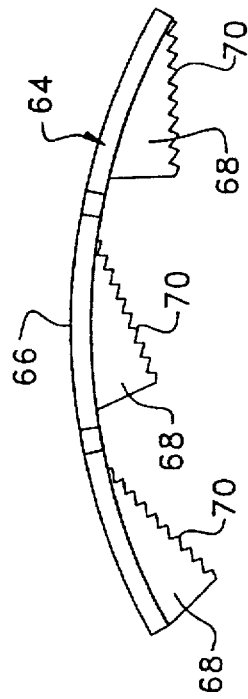
FIG. 5 is a side view of the stator according to the present invention.
Figure 6:
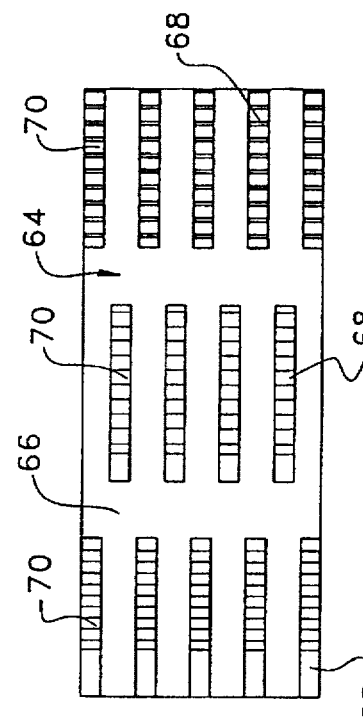
FIG. 6 is a bottom view of the stator of FIG. 5.

As seen in FIG. 3, a stator 64 is attached to the inner face of the radial wall 38 of the impeller housing 20 for comminuting material which strikes it. The stator 64 extends approximately 60° around the periphery of the impeller housing 20 near the discharge chute 28 between the 7 o'clock and 9 o'clock position. As best seen in FIGS. 5 and 6, the stator comprises a curved backing plate 66 and a plurality of teeth 68 extending from the inner face of the backing plate 66. The backing plate 66 has substantially the same radius of curvature as that of the radial wall 38 for facilitating attachment of the stator 64 to the radial wall 38.

The stator teeth 68 are arranged in three rows across the inner face of the backing plate 66. As best seen in FIG. 6, each adjacent row of teeth are located on the backing plate 66 in a staggered relationship. Each tooth 68 has a triangular shape and a serrated edge 70 for comminuting the material to be shredded. The teeth 68 are angled such that the serrated edge 70 faces the impeller 26. It is understood that the teeth 68 may be any suitable shape, such as rounded, rectangular, or polygonal.

As may be noted in FIGS. 2 and 3, the backing plate 58 of the impeller 26 is provided with a chipper knife 72 which is fixedly mounted on the impeller backing plate 58 and which cooperates with chipper feed hopper or chute 46. Sticks and limbs of up to about 2 ⅞ inches may be fed into the chute 46 for contacting with the chipping knife 72. The chipped material passes through an aperture or slot 74 in the impeller backing plate and is fed by centrifugal force and impeller induced air drafting to the stator 64.

The apparatus operates as follows. In one mode of operation, material to be shredded is drawn through first inlet opening 40 via the vacuum hose attachment 47. The material is drawn into the impeller housing 20 by the action of the rotating impeller 26. The material is drawn within the impeller structure between the impeller blades 56 where it is shredded by the serrated teeth 62 on the leading edge of each rotating blade 56. The partially shredded material is then delivered by cooperation of the impeller blades 56 and the containment provided by the back of the impeller 58 to the stator 64. The teeth 68 of the stator 64 provide a surface for further shredding as the material moves around the periphery of the impeller housing 20 toward the chute 32. Thereafter, the shredded material will exit the discharge chute 32 as mulch. If mulching is not desired, the collection bag 30 may be attached to the discharge chute 32 for bagging the shredded material. It has been found that the use of the shredding blades 56 in cooperation with the serrated teethed stator 64 provides up to an eight to one reduction of (wet or dry) leaves and other common garden and lawn vegetable matter.

In another mode of operation, branches and limbs are fed into the feed hopper 46, through the second inlet opening 44, and into the interior of the impeller housing 26. As the material contacts the impeller 26, the chipper knife 72 cuts chips from the material which are drawn through the slot 74 adjacent the chipper knife 72. These chips are then further reduced as described above with respect to the shredding portion of the apparatus.

In a further mode of operation, the apparatus is capable of functioning as a conventional type leaf blower. The vacuum hose attachment 47 is removed from the neck 45 and the cap 49 of the housing cover 42 is closed over the first inlet opening 40 to allow the influx of air through the vent holes 48 under the influence of the impeller 26. As so converted, the apparatus may be used as a conventional blower by directing the impeller driven effluent air exiting from the chute 32. The velocity of the effluent air flow is readily varied by control of the RPMs of engine 24.

The present invention may be embodied in other specific forms without departing from the spirit or essential attributes thereof and, accordingly, reference should be made to the appended claims, rather than to the foregoing specification, as indicating the scope of the invention.

What is claimed is:

1. An apparatus for comminuting lawn debris comprising:
   a housing including a first inlet opening for introducing material into the housing and a discharge opening for discharging material from the housing;
   a drive shaft extending into the housing;
   an impeller within the housing rotatably mounted on the drive shaft;
   a shredder located between one side of the impeller and the first inlet opening for shredding material passing into the housing through the first inlet opening and for reducing the size of the material; and
   a stator disposed radially outwardly from the impeller, the stator including serrated teeth so that material passing radially outwardly from the impeller strikes upon the serrated teeth further reducing the material.

2. The apparatus according to claim 1, wherein the serrated teeth comprise a plurality of rows of aligned substantially triangular teeth, each tooth having a serrated edge, the stator being attached to the inner face of a peripheral wall of the housing.

3. The apparatus according to claim 2, wherein the impeller includes a backing plate and a plurality of radially extending blades on one face of the backing plate, the backing plate forming a containment surface for limiting the movement of material in one direction along the drive shaft; the shredder comprises an angled serrated edge of each blade; and the discharge opening is located on the peripheral wall, the peripheral wall of the housing having a substantially voluted shape which cooperates with the ends of the impeller blades causing air drawn in from the first inlet opening to be propelled by the impeller blades axially into the housing and through the discharge opening.

4. The apparatus according to claim 3 further comprising a second inlet opening for introducing material into the housing, the first and second inlet openings introducing material into the housing from opposite axial end walls of the housing; and
   a chipper disposed between an opposite face of the impeller backing plate and the second inlet opening for chipping material passing into the housing through the second inlet opening, the impeller causing material from the shredder and the chipper to strike the serrated teeth of the stator and be propelled toward the discharge opening.

5. The apparatus according to claim 4, wherein the chipper means comprises a knife attached to the opposite face of the impeller, and the backing plate includes an aperture adjacent the knife which permits material chipped with the knife to pass to the opposite side of the impeller.

6. The apparatus according to claim 5, further comprising a vacuum hose operatively associated with the first inlet opening for facilitating the introduction of material into the housing.

7. The apparatus according to claim 2, further comprising a second inlet opening for introducing material into the housing, the first and second inlet openings introducing material into the housing from opposite axial end walls of the housing; and
   a chipper disposed between the impeller and the second inlet opening for chipping material passing into the housing through the second inlet opening, the impeller causing material from the shredder and the chipper to strike the serrated teeth of the stator and be propelled toward the discharge opening.

8. The apparatus according to claim 7, wherein the chipper means comprises a knife attached to a backing plate of the impeller.

9. The apparatus according to claim 1, wherein the impeller includes a backing plate and a plurality of radially extending blades on one face of the backing plate, the backing plate forming a containment surface for limiting the movement of material in one direction along the drive shaft; the shredder comprises an angled serrated edge of each blade; and the discharge opening is located on the peripheral wall, the peripheral wall of the housing having a substantially voluted shape which cooperates with the ends of the impeller blades causing air drawn in from the first inlet opening to be propelled by the impeller blades axially into the housing and through the discharge opening.

10. The apparatus according to claim 1, further comprising a second inlet opening for introducing material into the housing, the first and second inlet openings introducing material into the housing from opposite axial end walls of the housing; and
    a chipper disposed between the impeller and the second inlet opening for chipping material passing into the housing through the second inlet opening, the impeller causing material from the shredder and the chipper to strike the serrated teeth of the stator and be propelled toward the discharge opening.

11. The apparatus according to claim 10, wherein the chipper means comprises a knife attached to a backing plate of the impeller.

12. The apparatus according to claim 1, further comprising a vacuum hose operatively associated with the first inlet opening for facilitating the introduction of material into the housing.

13. The apparatus according to claim 1 wherein the impeller comprises a backing plate and a plurality of radially extending blades on one face of the backing plate, and the shredder comprises an angled serrated edge of each blade.

14. The apparatus according to claim 1 wherein the impeller generates approximately 1650 CFM of air at 150 mph through the discharge opening to function as a blower.

15. The apparatus according to claim 1 wherein the stator comprises a curved backing plate attached to the inner face of a peripheral wall of the housing, the serrated teeth extend from an inner face of the backing plate, each of the teeth having a serrated edge for comminuting the material to be shredded, the teeth are formed into a plurality of rows of aligned substantially triangular teeth.

16. An apparatus for comminuting lawn debris comprising:
    an impeller housing defined by a pair of opposed axial end walls and a substantially voluted peripheral wall therebetween, the housing including a first inlet opening located on one of the end walls for introducing material into the housing, a second inlet opening located on the opposite end wall for introducing material into the housing, and a discharge opening located on the peripheral wall for discharging material from the housing;
    a drive shaft extending into the peripheral housing;
    a drive means coupled with the drive shaft for rotatably driving the drive shaft;
    an impeller within the housing rotatably mounted on the drive shaft, the impeller including a backing plate having an aperture therein and a plurality of radially extending comminuting blades fixed to one face of the backing plate, the impeller blades causing air to be drawn in from the first inlet opening and propelled axially into the housing and through the discharge opening, the backing plate forming a containment surface for limiting the movement of material in one direction along the drive shaft, the comminuting blades extending into the housing for shredding material within the housing between the backing plate and the one axial end wall thereby reducing the size of the material;

a chipper knife attached to the other face of the impeller and adjacent the aperture for chipping material passing into the housing through the second inlet opening, the aperture permitting material chipped with the knife to pass to the opposite side of the impeller; and a stator attached to the inner face of the peripheral wall, the stator including serrated teeth, the impeller causing material to be propelled from the chipper knife and comminuting blades and strike the serrated teeth of the stator and be propelled toward the discharge opening.

17. The apparatus according to claim 16, wherein the serrated teeth comprise a plurality of rows of aligned substantially triangular teeth, each tooth having a serrated edge.

18. The apparatus according to claim 17, wherein each comminuting blade includes an angled serrated edge.

19. The apparatus according to claim 18, further comprising a vacuum hose operatively associated with the first inlet opening for facilitating the introduction of material into the impeller housing.

20. The apparatus according to claim 16, wherein each comminuting blade includes an angled serrated edge.

21. The apparatus according to claim 16, further comprising a vacuum hose operatively associated with the first inlet opening for facilitating the introduction of material into the impeller housing.

22. The apparatus according to claim 16 wherein the impeller generates approximately 1650 CFM of air at 150 mph through the discharge opening to function as a blower.

23. The apparatus according to claim 16 wherein the stator comprises a curved backing plate attached to the inner face of a peripheral wall of the housing, the serrated teeth extend from an inner face of the backing plate, each of the teeth having a serrated edge for comminuting the material to be shredded, the teeth are formed into a plurality of rows of aligned substantially triangular teeth.

* * * * *